(12) United States Patent
Hyodo et al.

(10) Patent No.: US 8,777,808 B2
(45) Date of Patent: Jul. 15, 2014

(54) WORKING VEHICLE CONTROL APPARATUS

(75) Inventors: Koji Hyodo, Kasumigaura (JP); Hiroki Nakazono, Ryugasaki (JP); Hirofumi Oouchi, Toride (JP); Atsushi Shimazu, Toride (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 252 days.

(21) Appl. No.: 13/377,973

(22) PCT Filed: Jun. 17, 2010

(86) PCT No.: PCT/JP2010/060299
§ 371 (c)(1),
(2), (4) Date: Dec. 13, 2011

(87) PCT Pub. No.: WO2010/147183
PCT Pub. Date: Dec. 23, 2010

(65) Prior Publication Data
US 2012/0100959 A1 Apr. 26, 2012

(30) Foreign Application Priority Data
Jun. 19, 2009 (JP) ................. 2009-146198

(51) Int. Cl.
*B60W 10/06* (2006.01)
*F16H 47/02* (2006.01)
(52) U.S. Cl.
USPC ............. 477/54; 477/68; 477/77; 477/181; 180/53.4
(58) Field of Classification Search
USPC ............... 477/54, 61, 68, 69, 77, 110, 181; 180/53.4, 53.7; 701/54
See application file for complete search history.

(56) References Cited

U.S. PATENT DOCUMENTS

| | | | |
|---|---|---|---|
| 7,877,183 B2* | 1/2011 | Hoff et al. | 701/51 |
| 2008/0093145 A1 | 4/2008 | Matsuyama | |
| 2008/0202468 A1* | 8/2008 | Grill et al. | 123/339.14 |
| 2009/0240406 A1* | 9/2009 | Fukushima et al. | 701/54 |
| 2010/0262353 A1* | 10/2010 | Hyodo et al. | 701/102 |
| 2012/0094801 A1* | 4/2012 | Hyodo et al. | 477/111 |

FOREIGN PATENT DOCUMENTS

| | | |
|---|---|---|
| JP | 2005-61322 A | 3/2005 |
| JP | 2008-138700 A | 6/2008 |
| WO | WO 2006/062018 A1 | 6/2006 |
| WO | WO 2009/054499 A1 | 4/2009 |

OTHER PUBLICATIONS

International Search Report dated Sep. 14, 2010 (one (1) page).

* cited by examiner

*Primary Examiner* — Roger Pang
(74) *Attorney, Agent, or Firm* — Crowell & Moring LLP

(57) ABSTRACT

A working vehicle control apparatus includes: a selection device that selects a power mode or an economy mode; a determination device that determines whether or not a speed restriction condition and a load pressure have been established; an engine rotational speed restriction device that restricts a maximum rotational speed of the motor upon selection of the economy mode to a lower speed side than a maximum rotational speed of the motor upon selection of the power mode when it is determined that the speed restriction condition has been established; and a vehicle speed restriction device that restricts a maximum vehicle speed upon selection of the economy mode to a lower speed side than a maximum vehicle speed upon selection of the power mode when it is determined that a speed restriction condition has not been established.

3 Claims, 13 Drawing Sheets

WORKING VEHICLE CONTROL APPARATUS

TECHNICAL FIELD

The present invention relates to a control apparatus of a working vehicle such as a wheel loader.

BACKGROUND ART

There is a conventionally known wheel loader in which a working actuator is operated on discharged oil of a hydraulic pump driven by an engine and engine output is used as travel driving force through a torque converter and a transmission device. There is such a wheel loader in which engine output torque characteristics are changed according to mode selection of work amount mode and fuel economy mode (refer to the patent literature 1). In the apparatus stated in the patent literature 1, engine output torque in a high rotation region is set smaller upon selection of fuel economy mode than upon selection of work amount mode, and the maximum pump absorption torque is set smaller accordingly. This achieves great travel driving force even in fuel economy mode.

CITATION LIST

Patent Literature

[PATENT LITERATURE 1] Japanese Laid-Open Patent Publication No. 2005-61322

SUMMARY OF INVENTION

Technical Problem

However, when, for instance, excavation work is performed with a wheel loader, a great travel driving force causes a reaction force acting on a lift arm to be great upon putting a bucket into a mound and causes a lift up force of the lift arm to be reduced, and thus workability may be reduced.

Solution to Problem

A working vehicle control apparatus according to a first aspect, comprises: a rotational speed control device that controls a rotational speed of a motor in accordance with an operation amount of an accelerator pedal; a hydraulic pump that is driven by the motor to supply a driving pressure to a working actuator on which a reaction force in accordance with a travel driving force acts; a travel drive device that transmits rotation of the motor to wheels through a torque converter; a speed ratio detection device that detects a speed ratio of an input shaft and an output shaft of the torque converter; a load pressure detection device that detects a load pressure of the hydraulic pump; a selection device that selects one of a power mode and an economy mode; a determination device that determines whether or not a speed restriction condition in which a speed ratio detected by the speed ratio detection device is equal to or less than a predetermined value and a load pressure detected by the load pressure detection device is equal to or greater than a predetermined value has been established; an engine rotational speed restriction device that restricts a maximum rotational speed of the motor upon selection of the economy mode to a lower speed side than a maximum rotational speed of the motor upon selection of the power mode when it is determined by the determination that the speed restriction condition has been established; and a vehicle speed restriction device that restricts a maximum vehicle speed upon selection of the economy mode to a lower speed side than a maximum vehicle speed upon selection of the power mode when it is determined by the determination device that a speed restriction condition has not been established.

According to a second aspect of the present invention, the working vehicle control apparatus according to the first aspect may further comprise: a speed change device that changes a transmission speed step in accordance with a speed ratio detected by the speed ratio detection device; a vehicle speed detection device that detects a vehicle speed; and a speed change control device that permits the speed change device to shift up in a condition where a vehicle speed detected by the vehicle speed detection device is equal to or greater than a predetermined value, wherein it is preferable that the speed change control device permits shift up in a condition where a detected vehicle speed is equal to or greater than a first predetermined value upon selection of the economy mode and permits shift up in a condition where a detected vehicle speed is equal to or greater than a second predetermined value, which is greater than the first predetermined value, upon selection of the power mode.

Advantageous Effect of the Invention

According to the present invention, a maximum rotational speed of a motor upon selection of economy mode is restricted to a lower speed side than a maximum rotational speed of the motor upon selection of power mode, and a maximum vehicle speed upon selection of economy mode is restricted to a lower speed side than a maximum vehicle speed upon selection of power mode, and therefore travel driving force during work can be reduced and travel and work are realized as desired by the operator by operating the selection device.

DESCRIPTION OF EMBODIMENTS

A working vehicle control apparatus according to an embodiment of the present invention will now be explained with reference to FIG. 1 to FIG. 13.

Figure 1:
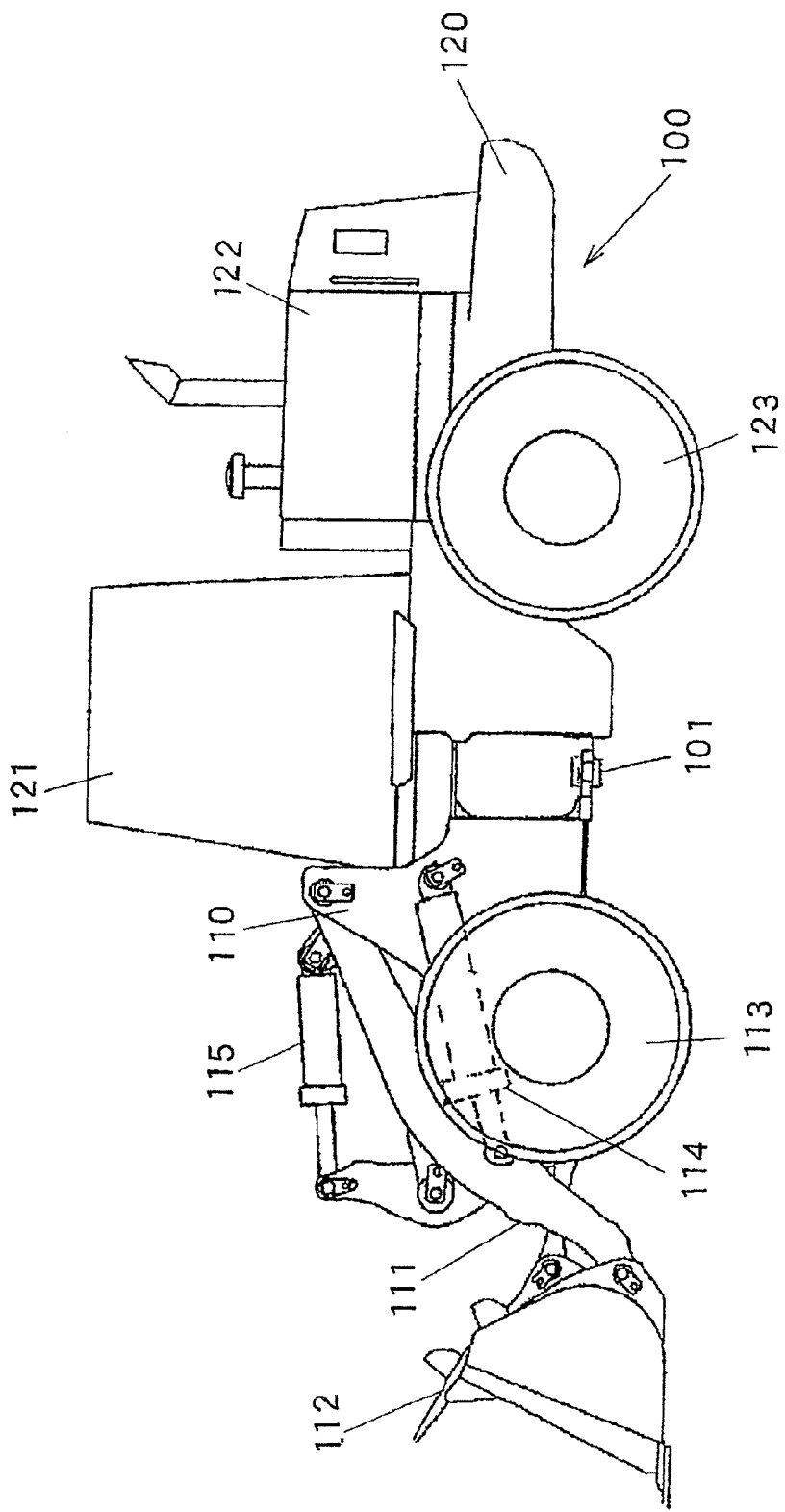
FIG. 1 is a side view of a wheel loader that is an example of a working vehicle according to an embodiment of the present invention.

FIG. 1 is a side view of a wheel loader that is an example of a working vehicle to which the control apparatus according to the present embodiment is applied. A wheel loader 100 is constituted with a front body 110 that includes an arm 111, a bucket 112, tires 113, and the like and a rear body 120 that includes a driver cabin 121, an engine bay 122, tires 123, and the like. The arm 111 vertically rotates (articulates up and down) on actuation of an arm cylinder 114 and the bucket 112 vertically rotates (dumps or crowds) on actuation of a bucket cylinder 115. The front body 110 and the rear body 120 are rotatably connected with each other through a center pin 101, so that expansion and contraction of a steering cylinder (not shown in the figure) causes the front body 110 to swing side to side with respect to the rear body 120.

Figure 2:
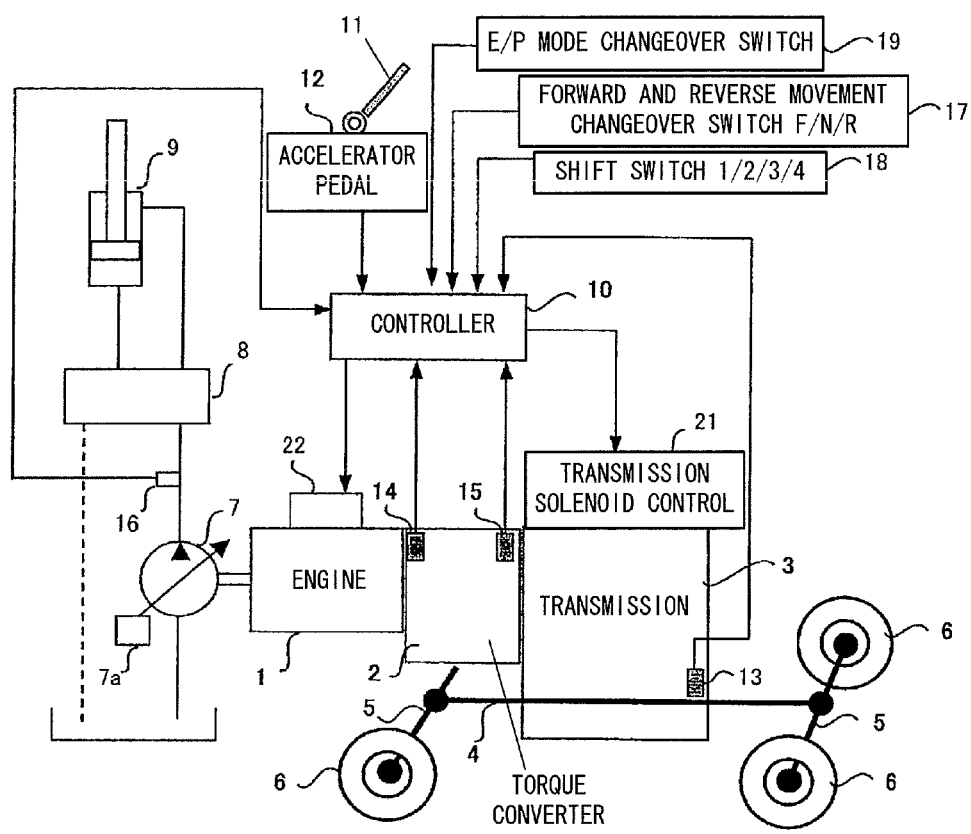
FIG. 2 is a diagram showing an outline structure of a control apparatus according to an embodiment of the present invention.

FIG. 2 is a diagram showing the outline structure of the control apparatus according to the present embodiment. An input shaft of a torque converter 2 is connected to an output shaft of an engine 1, and an output shaft of the torque converter 2 is connected to a transmission 3. The torque converter 2 is a fluid clutch device constituted with a well known impeller, a turbine, and a stator, and rotation of the engine 1 is transmitted to the transmission 3 through the torque converter 2. The transmission 3 includes hydraulic clutches that shift its speed step, so that rotation of the output shaft of the torque converter 2 is shifted at the transmission 3. The shifted rotation is transmitted to tires 6 (113 and 123 of FIG. 1) through a propeller shaft 4 and axles 5 and thus the vehicle travels.

A variable displacement working hydraulic pump 7 is driven by the engine 1 so as to discharge pressure oil. Discharged oil from the hydraulic pump 7 is led to a working actuator 9 (for example, the arm cylinder 114) through a control valve 8, and thus the actuator 9 is driven. The control valve 8 is operated by an operating lever not shown in the figures so as to control the flow of pressure oil from the hydraulic pump 7 to the actuator 9. The pump displacement is changed by a regulator 7a. The regulator 7a changes a pump displacement in accordance with a pump discharge pressure so as to perform, for instance, constant torque control that causes a working torque to be constant. It is to be noted that the hydraulic pump 7 may be a fixed displacement pump such as a gear pump.

A controller 10 is configured to include an arithmetic processing unit having a CPU, a ROM, a RAM, other peripheral circuits, and the like. The controller 10 is input with a signal from each of an accelerator operation amount detector 12 that detects an operation amount of an accelerator pedal 11, a vehicle speed detector 13 that detects a rotational speed of the output shaft of the transmission 3, i.e., the vehicle speed, a rotational speed detector 14 that detects a rotational speed Ni of the input shaft of the torque converter 2, a rotational speed detector 15 that detects a rotational speed Nt of the output shaft of the torque converter 2, a pressure detector 16 that detects a discharge pressure P of the hydraulic pump 7, a forward and reverse movement changeover switch 17 that instructs forward or reverse movement of the vehicle, a shift switch 18 that instructs an upper limit of a speed step between the first speed and the fourth speed, and a mode changeover switch 19 that selects a power mode (hereinafter, the P mode) in which priority is given to workability or an economy mode (hereinafter, the E mode) in which priority is given to fuel economy.

Figure 3:
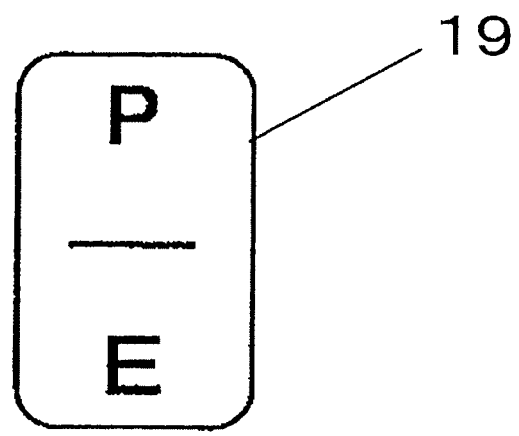
FIG. 3 is a view showing an example of a mode changeover switch.

The mode changeover switch 19 is constituted with an alternate switch operable of switching between a P position and an E position as shown in FIG. 3. It is to be noted that while in the present embodiment, the mode changeover switch 19 is operated to switch the mode between the P mode and the E mode, the mode may be switched to a normal mode other than the P mode and the E mode by a switch operation not shown in the figures.

The torque converter 2 has a function to increase output torque over input torque, i.e., a function to make a torque ratio 1 or greater. The torque ratio is reduced with an increase in a torque converter speed ratio e (output rotational speed Nt/input rotational speed Ni), which is a ratio of the rotational speeds between the input shaft and the output shaft of the torque converter 2. For instance, when travel load is increased during traveling in a state where the engine rotational speed is constant, the output rotational speed Nt of the torque converter 2, i.e., the vehicle speed, is reduced and the torque converter speed ratio e is reduced. At this time, the torque ratio is increased, thereby allowing the vehicle to travel on a greater driving force (traction force).

Figure 4:
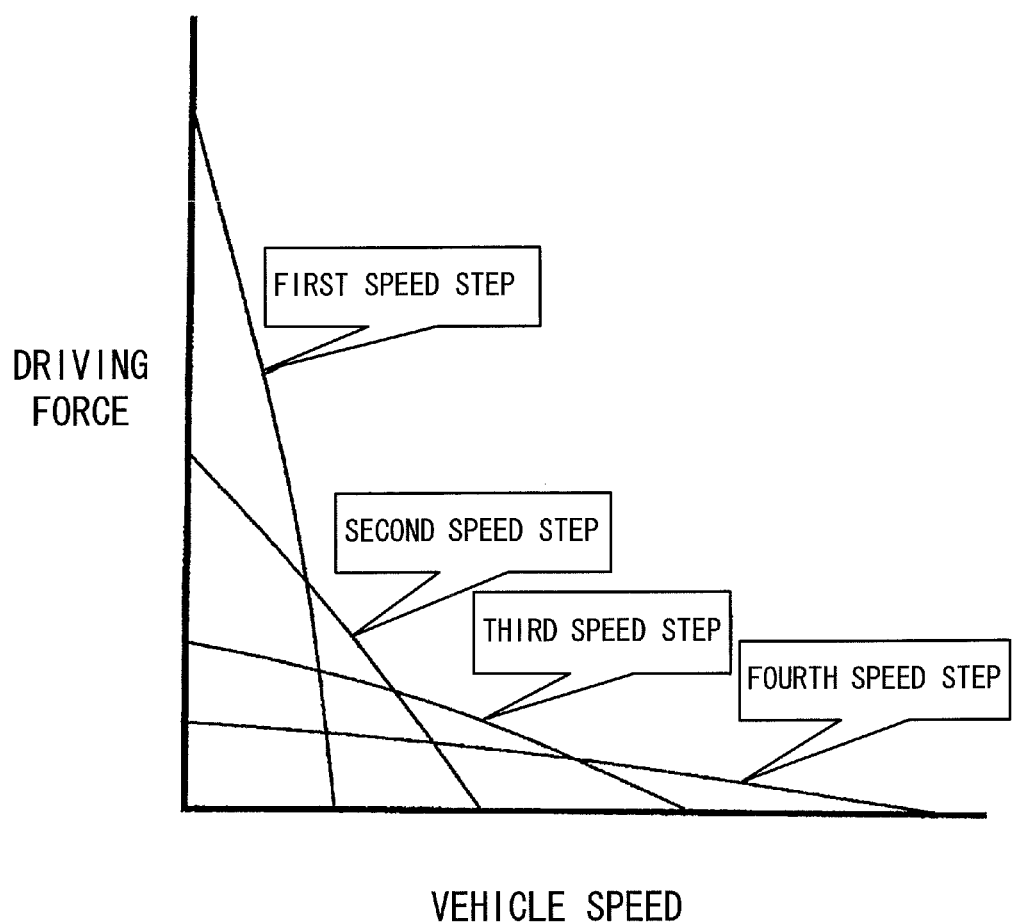
FIG. 4 is a diagram showing a relationship between vehicle speed and travel driving force in each speed step.

The relationship between a vehicle speed and a driving force in each speed step is as shown in FIG. 4, and, comparing at the same vehicle speed, the lower the vehicle speed is, the greater the driving force is (low speed high torque), and the higher the vehicle speed is, the less the driving force is (high speed low torque). In addition, when the speed step is lower, the greater driving force can be achieved at the same vehicle speed. In the present embodiment, as described later, the characteristics of FIG. 4 are modified in accordance with travel mode.

The transmission 3 is an automatic transmission that has a solenoid valve corresponding to each speed step of the first speed to the fourth speed. These solenoid valves are driven by control signals that are output from the controller 10 to a solenoid control unit 21. There are two types of automatic transmission control, i.e., torque converter speed ratio reference control by which the speed is shifted when the torque converter speed ratio e reaches a predetermined value and vehicle speed reference control by which the speed is shifted when the vehicle speed reaches a predetermined value. In the present embodiment, an explanation is made on an assumption that the speed step of the transmission 3 is controlled by the torque converter speed ratio reference control.

Figure 5:
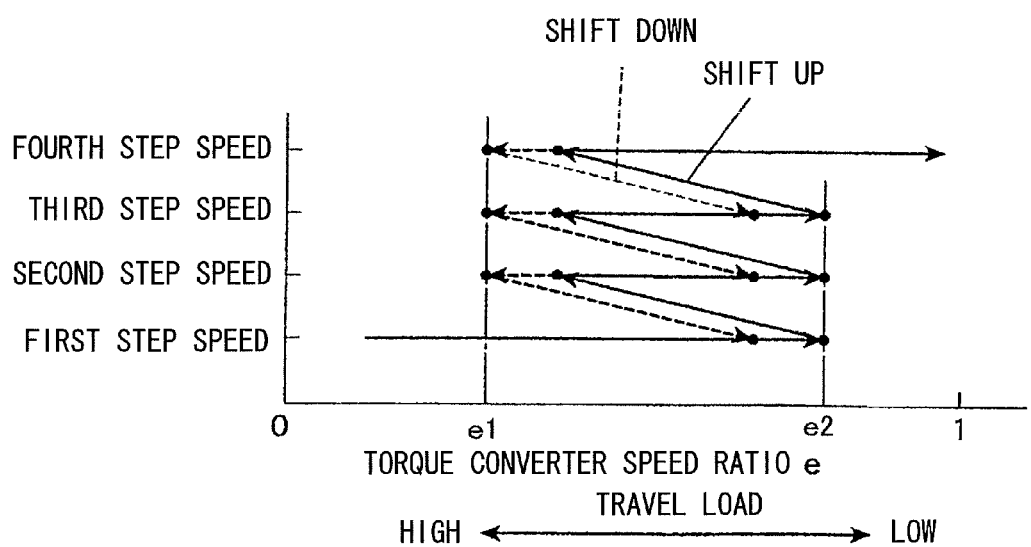
FIG. 5 is a diagram showing transmission timing based upon a torque converter speed ratio.

FIG. 5 is a diagram showing speed change timing by the torque converter speed ratio reference control. In the controller 10, a torque converter speed ratio e1 that serves as a reference of shift down and a torque converter speed ratio e2 that serves as a reference of shift up are stored in advance.

The controller 10 calculates the torque converter speed ratio e by using signals from the rotational speed detectors 14 and 15, outputs a shift up signal to the solenoid control unit 21 if the calculated speed ratio e exceeds the reference speed ratio e2, and, outputs a shift down signal to the solenoid control unit 21 if the calculated speed ratio e falls below the reference speed ratio e1. This causes the speed step of the transmission 3 to be automatically shifted between the first speed and the fourth speed in accordance with the torque converter speed ratio e. More specifically, when travel load becomes low, the torque converter speed ratio e is increased, and the torque converter speed ratio e becomes equal to or greater than the predetermined value e2, the speed step is shifted up by one step. On the other hand, when travel load becomes high, the torque converter speed ratio e is reduced, and the torque converter speed ratio e becomes equal to or less than the predetermined value e1, the speed step is shifted down by one step. At this time, the speed step is automatically shifted with the speed step selected by the shift switch 18 as an upper limit. For example, when the second speed is selected by the shift switch 18, the speed step is set to the first speed or the second speed, and when the first speed is selected, the speed step is fixed to the first speed.

The controller 10 controls the engine rotational speed to be a target engine speed in accordance with an operation amount of the accelerator pedal 11. More specifically, when a depressing amount of the accelerator pedal 11 is increased, the target engine speed becomes higher and the controller 10 outputs a control signal corresponding to this target engine speed to an engine control unit 22 (FIG. 2), thereby controlling the engine rotational speed. When desiring to increase the travel speed or increase the travel driving force, the operator increases a depressing amount of the accelerator pedal 11 so as to increase the engine rotational speed.

Figure 6:
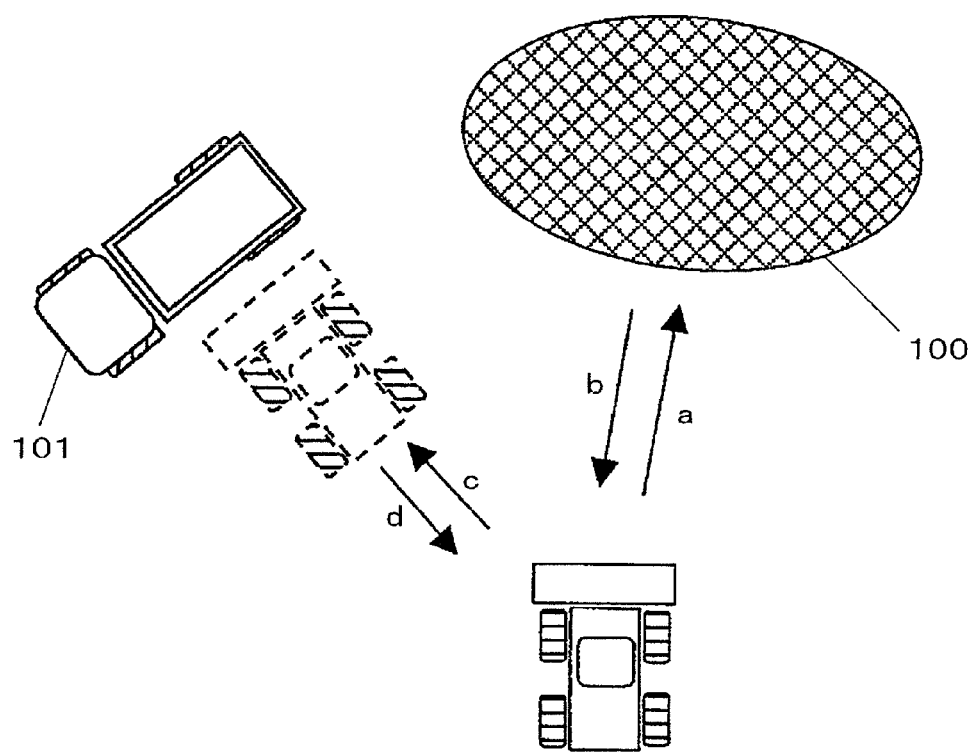
FIG. 6 is a view showing V-cycle loading work.

FIG. 6 is a view showing an example of works using the wheel loader (V-cycle loading work). In this work, at first, (a) the wheel loader travels forward, the bucket 112 is put into a mound 100, and sand, gravel, and dirt are taken into the bucket, and after those, (b) the wheel loader travels rearward and turns around. Then, (c) the wheel loader travels forwards to a dump truck 101 and the sand, gravel, and dirt in the bucket are loaded into the dump truck, and (d) the wheel loader travels rearward so as to go back to the initial position. The above operations (a) to (d) are repeated to perform the work. The work operations here are roughly divided into two, i.e., an excavation operation and travel operations (load, convey, and travel).

In the present embodiment, as described below, the engine maximum rotational speed is restricted in accordance with the work mode during excavation operation and the maximum vehicle speed is restricted in accordance with the travel mode during travel operation. It is to be noted that the E mode and the P mode in the work mode and the E mode and the P mode in the travel mode are simultaneously selected by the single mode changeover switch 19 shown in FIG. 3. More specifically, if the mode changeover switch 19 is operated into the P position, the work mode and the travel mode are set to the P mode and, if the mode changeover switch 19 is operated into the E position, the work mode and the travel mode are set to the E mode.

Figure 7:
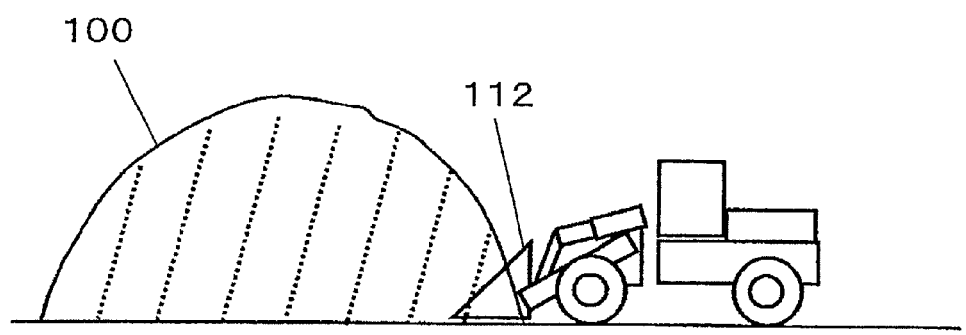
FIG. 7 is a view showing excavation operation.

The maximum rotational speed restriction during excavation will be explained at first. Since during excavation, as shown in FIG. 7, the bucket 112 is put into the mound 100 and the lift arm 111 is driven, the torque converter speed ratio e becomes low and a pump load pressure P becomes high. In view of this point, whether or not an excavation operation has been made is determined by whether or not the speed restriction condition has been established.

Figure 8:
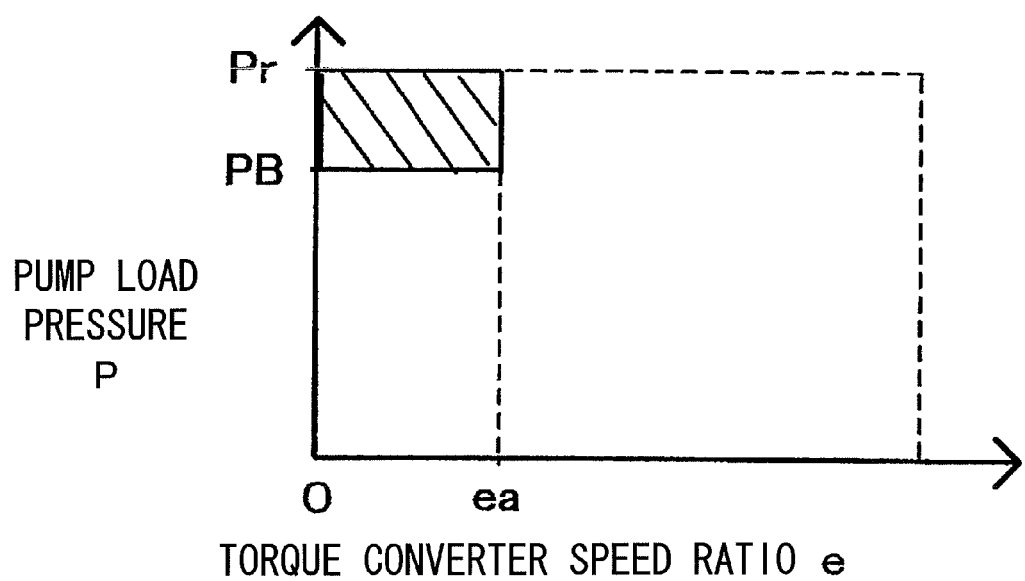
FIG. 8 is a diagram showing an establishment range of a speed restriction condition.

FIG. 8 is a diagram showing the establishment range of the speed restriction condition. The speed restriction condition is established when the first speed step or the second speed step is selected by the shift switch 18 and in FIG. 8, the torque converter speed ratio e is equal to or less than a predetermined value ea (for example, 0.3), which is a predetermined torque converter speed ratio during excavation, and the pump load pressure P is equal to or greater than a predetermined value PB (hatched region), which is a predetermined load pressure during excavation. At this time, the controller 10 makes a decision that the vehicle is in excavation operation. It is to be noted that Pr in the figure corresponds to a relief pressure at the hydraulic pump 7. When the speed restriction condition is not established, the controller 10 makes a decision that the vehicle is in travel operation.

Figure 9:
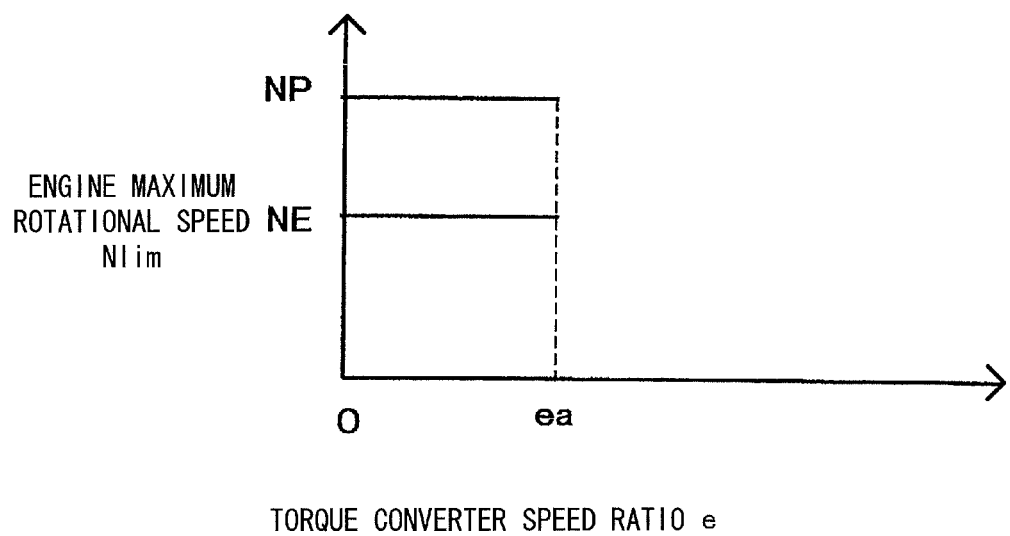
FIG. 9 is a diagram showing a relationship between torque converter speed ratio and engine maximum rotational speed during excavation.

FIG. 9 is a diagram showing the relationship between the torque converter speed ratio e and an engine maximum rotational speed Nlim during excavation. During excavation, a control signal is output from the controller 10 to the engine control unit 22 so that the engine maximum rotational speed in the P mode is restricted to a predetermined value NP and the engine rotational speed in the E mode is restricted to a predetermined value NE (<NP). In other words, the engine maximum rotational speed in the E mode is restricted to a lower speed side than the engine maximum rotational speed in the P mode.

Figure 10:
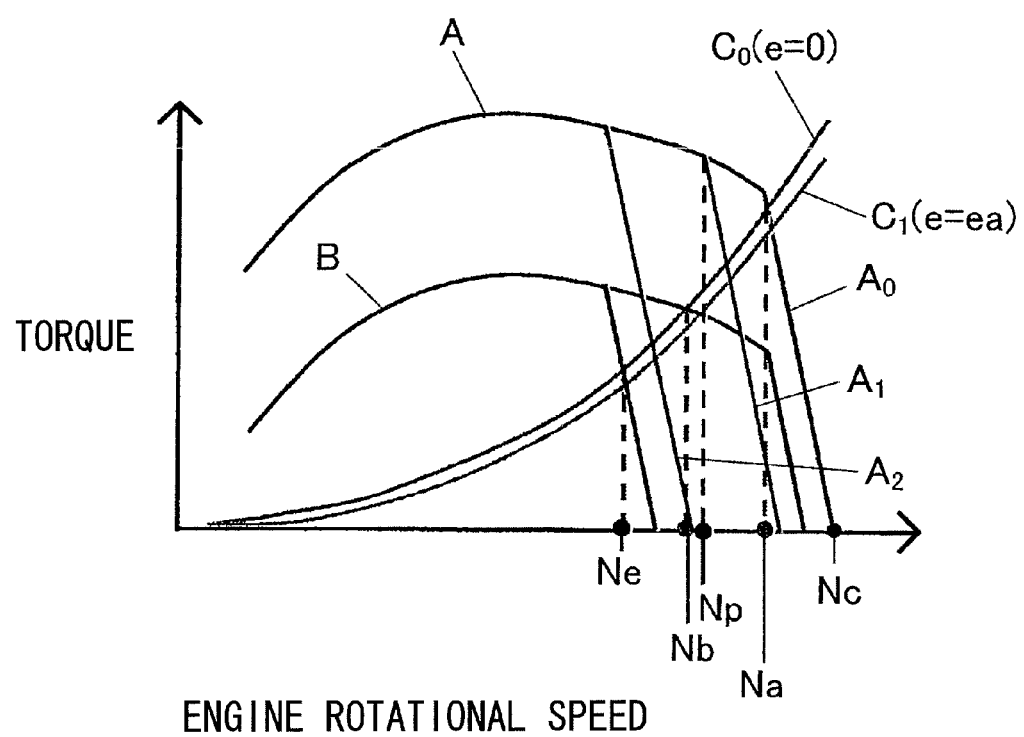
FIG. 10 is a diagram showing torque characteristics achieved by the control apparatus according to the present embodiment.

FIG. 10 is a torque diagram showing the relationship between the engine rotational speed and the torque when the accelerator pedal 12 is fully depressed during excavation. In the figure, a characteristic A is an engine output torque, in particular, a characteristic A0 is an engine output torque in the normal mode where the engine rotational speed is not restricted, a characteristic A1 is an engine output torque in the P mode, and a characteristic A2 is an engine output torque in the E mode. In the E mode, a restriction amount of the engine maximum rotational speed is greater than that in the P mode, and the characteristic A2 is shifted to a lower speed side than the characteristic A1.

In FIG. 10, a characteristic B is a characteristic achieved by shifting the characteristic A to a lower side by the maximum absorption torque (pump input torque) of the hydraulic pump, and corresponds to a travel engine torque available for travel. It is to be noted that while the pump input torque varies depending upon work content and accordingly the torque available for travel varies, the figure shows the characteristic B of travel engine torque corresponding to a representative pump input torque during excavation work.

In FIG. 10, characteristics C0 and C1 each represent an input torque (torque converter input torque) of the torque converter 2 when the torque converter 2 is driven by the engine 1, and the torque converter input torque is increased with a rise of engine rotational speed N. The characteristics C0 and C1 are characteristics when the torque converter speed ratio e is 0 and ea, respectively, and the torque converter input torque is reduced with an increase in the torque converter speed ratio e.

The intersections of the characteristic B and the characteristics C0 and C1 are matching points during excavation, and the engine rotational speed becomes a value of those matching points. For example, the engine rotational speed at the matching points in the P mode is Np and Nb. With a constant pump input torque, the engine rotational speed is changed within this range during excavation, and the maximum value of the engine rotational speed in the P mode becomes Np. On the other hand, the maximum value of the engine rotational speed at the matching point in the E mode is Ne, which is less than the engine rotational speed Np in the P mode. It is to be noted that the intersection of the characteristic A0 and the characteristic C0 is a matching point when the pump input torque is 0, i.e., when the pump 7 is in an unloaded state, and the engine rotational speed at that time is Na. The engine maximum rotational speed when the pump is in an unloaded state is Nc.

When the engine rotational speed is at a matching point, the travel driving force in proportion to the square of this engine rotational speed. When the bucket 112 is put into the mound 100, a reaction force acts upon the lift arm 111 from sand, gravel, dirt, and the like. At this time, if the travel driving force is too great, the reaction force also becomes great and lift up force of the lift arm is reduced, thereby reducing workability.

With this respect, in the present embodiment, as described earlier, the engine maximum rotational speed is restricted low in order of the P mode to the E mode, and hence the matching point of the engine rotational speed is reduced, thereby reducing the travel driving force. In other words, the travel driving force in the E mode becomes $(NE/NP)^2$ of the travel driving force in the P mode. Due to this, travel driving force in the E mode becomes less than that in the P mode, thereby reducing the reaction force acting on the arm 111 from sand, gravel, dirt, and the like. As a result, even if the accelerator pedal 11 is fully depressed, the travel driving force does not become too great, thereby allowing the bucket 112 to be lifted up with ease.

Figure 11:
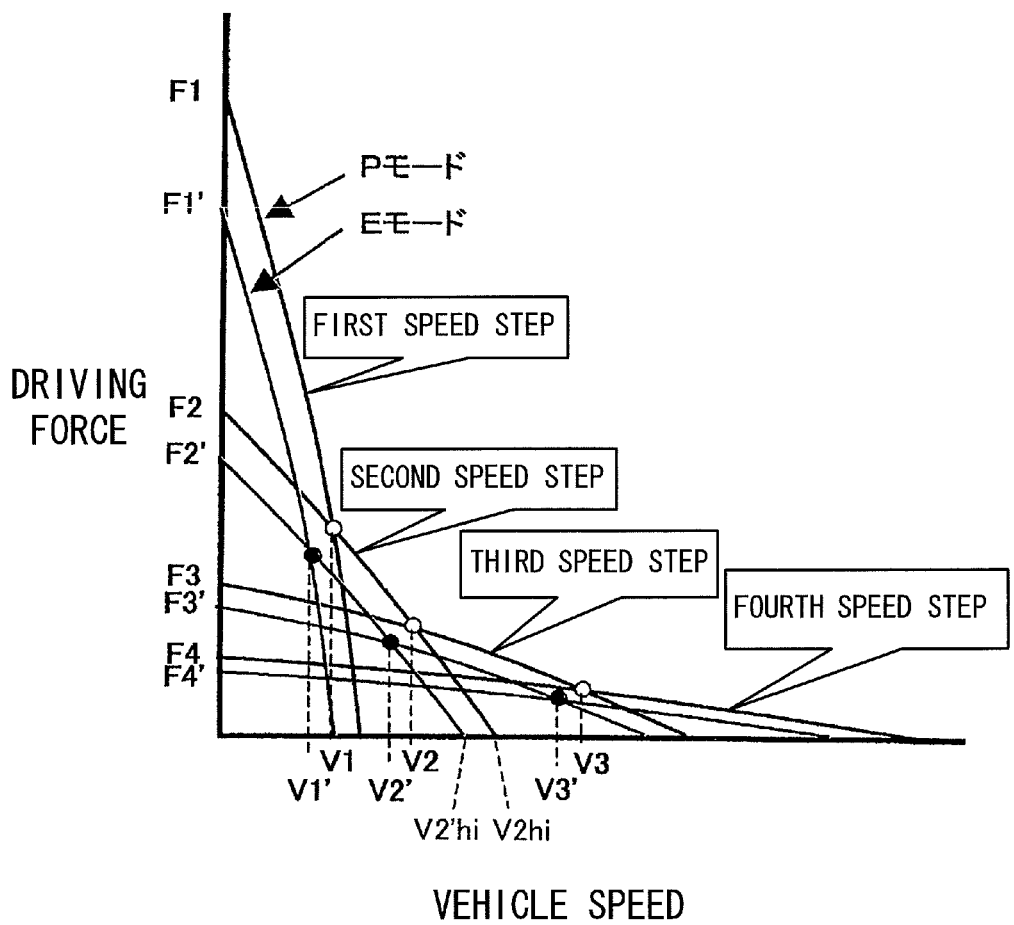
FIG. 11 is a travel performance diagram by the control apparatus according to the present embodiment.

Next, maximum vehicle speed restriction during travel will be explained. FIG. 11 is a traveling performance diagram showing the relationship between the vehicle speed and the driving force in each mode when the accelerator pedal 11 is fully depressed. In the present embodiment, a control signal is output from the controller 10 to the engine control unit 22 during travel such that the engine maximum rotational speed in the E mode is restricted to the lower speed side than the engine maximum rotational speed in the P mode. This causes the characteristic in the E mode to be shifted leftward than the characteristic in the P mode. In other words, comparing at the same vehicle speed, travel driving force in the P mode is greater than that in the E mode in each of the speed steps. In addition, the maximum vehicle speed in the P mode is higher than that in the E mode in each of the speed steps. For instance, in the second speed step, the maximum vehicle speed in the P mode becomes V2hi and the maximum vehicle speed in the E mode becomes V2'hi (<V2hi).

The intersection of characteristics of the first speed step and the second speed step, the intersection of characteristics of the second speed step and the third speed step, and the intersection of characteristics of the third speed step and the fourth speed step each represent a shift point at the time of automatic speed change. More specifically, in the P mode, the speed step is shifted up to the second speed step when the driving force is reduced and the vehicle speed reaches V1, the speed step is shifted up to the third speed step when the vehicle speed reaches V2, and the speed step is shifted up to the fourth speed step when the vehicle speed reaches V3. In the E mode, the speed step is shifted up to the second speed step when the driving force is reduced and the vehicle speed reaches V1', the speed step is shifted up to the third speed step when the vehicle speed reaches V2', and the speed step is shifted up to the fourth speed step when the vehicle speed reaches V3'.

Here, the vehicle speeds V1', V2', and V3' at the shift points in the E mode are lower than the vehicle speeds V1, V2, and V3 at the shift points in the P mode, respectively, and the speed step is shifted up in the E mode at a timing earlier than that in the P mode.

Figure 12:
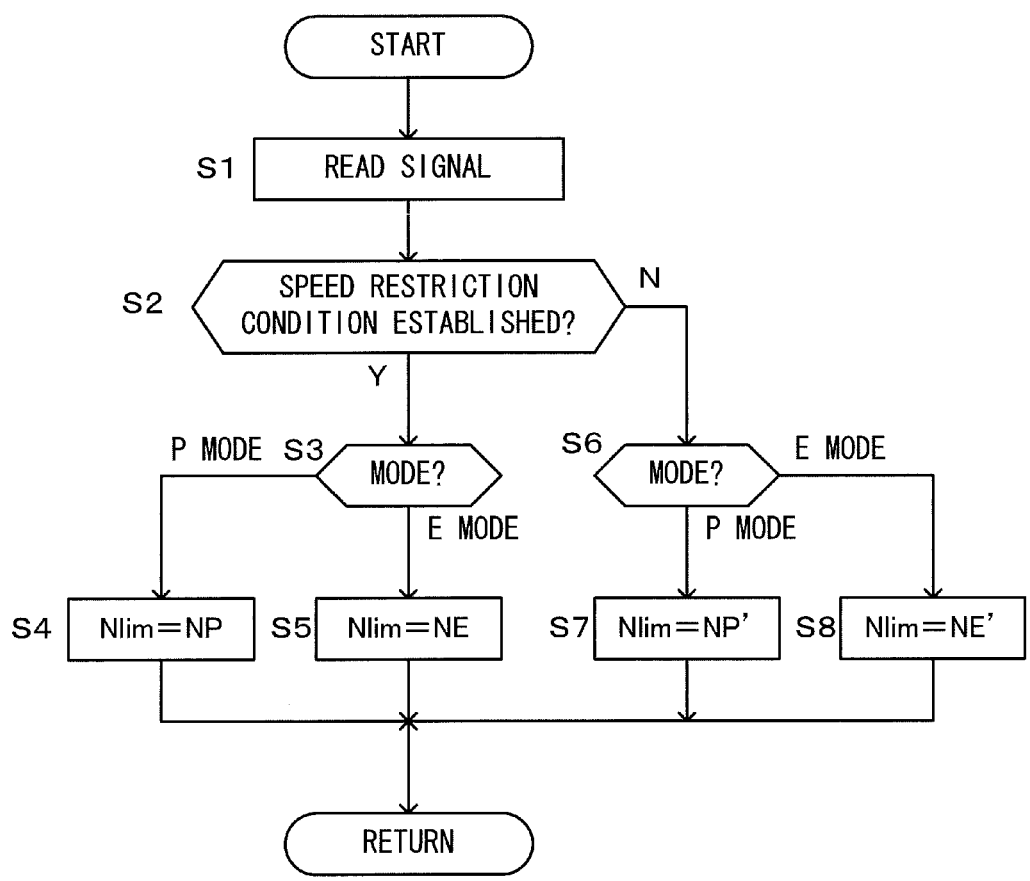
FIG. 12 is a flowchart showing an example of processing related to engine control by the control apparatus according to the present embodiment.

The above operation can be achieved by engine control and automatic speed change control of the controller 10. FIG. 12 is a flowchart showing an example of processing related to engine control to be executed by the controller 10. The processing shown in this flowchart is initiated by, for instance, turning on an engine key switch. In a step S1, signals from the variety of detectors 12 to 16 and the switches 17 to 19 are read.

In a step S2, a decision is made as to whether or not the speed restriction condition has been established. A decision is made that the speed restriction condition has been established if the first speed step or the second speed step is selected by the shift switch 18, the torque converter speed ratio e determined by the rotational speed detectors 14 and 15 is equal to or less than the predetermined value ea, and the load pressure P detected by the pressure detector 16 is equal to or greater than the predetermined value PB. If a positive decision is made in the step S2, the flow of control proceeds to a step S3, where a decision is made as to which of the P mode and the E mode has been selected by a signal from the mode changeover switch 19.

If a decision is made in the step S3 that the P mode has been selected, the flow of control proceeds to a step S4, where a control signal is output to the engine control unit 22 so that the engine maximum rotational speed Nlim becomes the predetermined value NP. This causes the engine output torque characteristic during excavation to be the characteristic A1 of FIG. 10. On the other hand, if a decision is made in the step S3 that the E mode has been selected, the flow of control proceeds to a step S5, where a control signal is output to the engine control unit 22 so that the engine maximum rotational speed Nlim becomes the predetermined value NE. This causes the engine output torque characteristic during excavation to be the characteristic A2 of FIG. 10.

On the other hand, if a decision is made in the step S2 that the speed restriction condition has not been established, the flow of control proceeds to a step S6, where a decision is made as to which of the P mode and the E mode has been selected by a signal from the mode changeover switch 19. If a decision is made in the step S6 that the P mode has been selected, the flow of control proceeds to a step S7, and if a decision is made that the E mode has been selected, the flow of control proceeds to a step S8. In the step S7, a control signal is output to the engine control unit 22 so that the engine maximum rotational speed Nlim becomes a predetermined value NP', and in the step S8, a control signal is output to the engine control unit 22 so that the engine maximum rotational speed Nlim becomes a predetermined value NE', which is less than NP'. It is to be noted that the predetermined values NP' and NE' are set to different values from the predetermined values NP and NE. This causes, as shown in FIG. 11, the maximum vehicle speed in the E mode to be restricted to a lower speed side than the maximum vehicle speed in the P mode.

Figure 13:
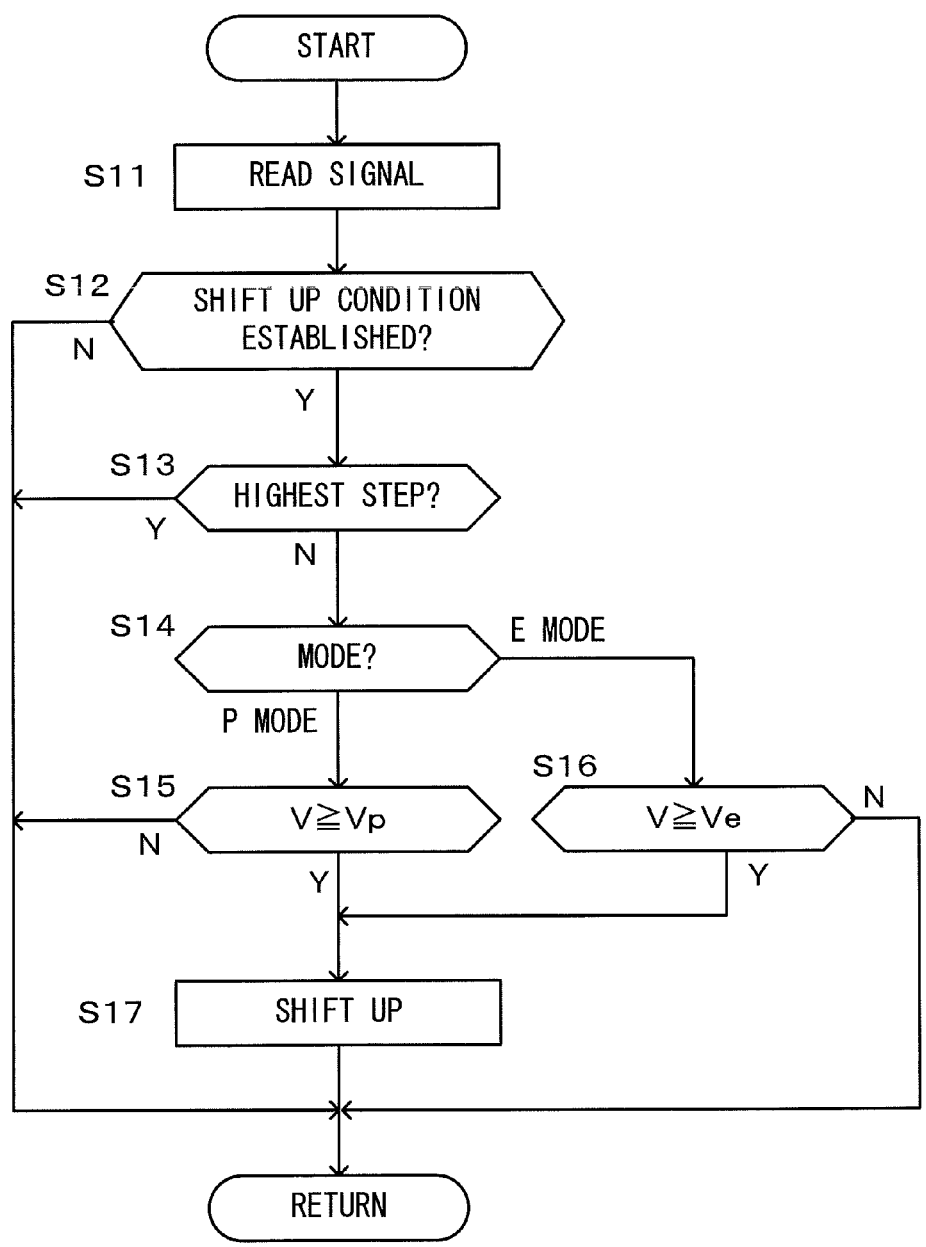
FIG. 13 is a flowchart showing an example of processing related to automatic speed change control by the control apparatus according to the present embodiment.

FIG. 13 is a flowchart showing an example of processing related to automatic speed change control to be executed by the controller 10, in particular processing related to shift up. The processing shown in this flowchart is initiated by, for example, turning the engine key switch on. In a step S11, signals from the variety of detectors 12 to 16 and switches 17 to 19 are read.

In a step S12, a decision is made as to whether or not the torque converter speed ratio e is equal to or greater than the predetermined value e2 (FIG. 5), i.e., whether or not the shift up condition has been established. If a positive decision is made in the step S12, the flow of control proceeds to a step S13, and, if a negative decision is made therein, the flow of control returns. In the step S13, a decision is made as to whether or not a current speed step is the highest step set by the shift switch 18. If a negative decision is made in the step S13, the flow of control proceeds to a step S14, and, if a positive decision is made therein, the flow of control returns.

In the step S14, a decision is made as to which of the P mode and the E mode has been selected by a signal from the mode changeover switch 19. If a decision is made in the step S14 that the P mode has been selected, the flow of control proceeds to a step S15, where a decision is made as to whether or not a vehicle speed V having been detected by the vehicle speed detector 13 is equal to or greater than a predetermined set vehicle speed Vp. The set vehicle speed Vp is set for each of the speed steps, and the set vehicle speeds Vp of the first speed step to the third speed step are, for example, V1, V2, and V3 of FIG. 11, respectively. If a positive decision is made in the step S15, the flow of control proceeds to a step S17, and, if a negative decision is made therein, the flow of control returns. In the step S17, a shift up signal is output to the solenoid control unit 21. This causes the speed step to be shifted up by one step.

On the other hand, if a decision is made in the step S14 that the E mode has been selected, the flow of control proceeds to a step S16, where a decision is made as to whether or not the vehicle speed V is equal to or greater than a predetermined set vehicle speed Ve. The set vehicle speed Ve is set for each of the speed steps, and the set vehicle speeds Ve of the first speed step to the third speed step are, for instance, V1', V2', and V3' of FIG. 11, respectively. In other words, the set vehicle speed Ve in the E mode is set to a lower value than the set vehicle speed Vp in the P mode. If a positive decision is made in the step S16, the flow of control proceeds to the step S17, and, if a negative decision is made therein, the flow of control returns. It is to be noted that in the shift up processing shown in FIG. 13, it may be arranged to permit shift up if the vehicle speed V is equal to or greater than the set vehicle speed Vp or Ve and the speed restriction condition described above has not been established.

In the above control apparatus, if the operator selects the E mode, the engine maximum rotational speed becomes lower than that in the P mode, driving force during excavation is kept low, and thus the tires 6 are less likely to slip. In addition, acceleration performance becomes smooth during travel and the shift up timing of automatic speed change becomes early, so that the transmission is shifted up even if the engine rotational speed is low, and the maximum vehicle speed is also reduced. This causes the vehicle to move smoothly throughout the excavation work, and the overall vehicle movement as desired by the operator can be achieved upon selection of the E mode.

On the other hand, if the operator selects the P mode, the engine maximum rotational speed becomes higher than that in the E mode and the driving force is increased during excavation enough for the tires 6 to slip. In addition, acceleration is increased during travel, automatic speed change timing becomes late, the engine rotational speed is shifted up at a higher speed, and hence the maximum vehicle speed becomes higher. This causes the vehicle to move dynamically with good acceleration throughout the excavation work, and the overall vehicle movement as desired by the operator can be achieved upon selection of the P mode.

The following operations and advantageous effects can be achieved according to the present embodiment.

(1) It is arranged that a decision is made as to whether or not the vehicle is in excavation operation depending upon whether or not the speed step of the transmission 3 is equal to or less than the second speed, the torque converter speed ratio e is equal to or less than the predetermined value ea, and the pump load pressure P is equal to or greater than the predetermined value PB, i.e., the speed restriction condition has been established, and the engine maximum rotational speed NE in the E mode during excavation operation is restricted to a lower speed side than the engine maximum rotational speed NP in the P mode. In this manner, an increase in a travel driving force during excavation work can be limited so that the bucket 112 is lifted up with ease, improving workability.

(2) It is arranged that an engine maximum rotational speed NE' in the E mode during travel operation when the speed restriction condition has not been established is restricted to a lower speed side than an engine maximum rotational speed NP' in the P mode. This allows the maximum vehicle speed in the E mode to be reduced to a lower speed side, thereby allowing the vehicle to travel at a restricted speed.

(3) Since the set vehicle speed Ve at which shift up is permitted in the E mode is set lower than the set vehicle speed Vp at which shift up is permitted in the P mode, shift up is enabled at an earlier timing in the E mode than that in the P mode, thereby allowing smooth travel.

(4) The P mode and the E mode of the work mode and the P mode and the E mode of the travel mode are selected by the single mode changeover switch 19. Hence, the structure of the switch is simple and the switch operation is prevented from being complicated. In addition, the E mode is selected with priority given to reduction in fuel economy or during light load work and the P mode is selected with priority given to an amount of work or during heavy excavation work so as to allow the vehicle to move as desired by the operator both during work and during travel.

It is to be noted that while in the above embodiment, the controller 10 performs processing to determine that the speed restriction condition has been established when the speed step of the transmission 3 is equal to or less than the second speed, the torque converter speed ratio e is equal to or less than the predetermined value ea, and the pump load pressure P is equal to or greater than the predetermined value PB, a decision may be made that the speed restriction condition has been established at least when the torque converter speed ratio e is equal to or less than the predetermined value ea and the pump load pressure P is equal to or greater than the predetermined value PB, and the determination means is not limited to that described above. Any structure may be adopted in the controller 10 and the engine control unit 22 as engine rotational speed restriction means as long as the engine maximum rotational speed in the E mode is restricted to a lower speed side than the engine maximum rotational speed in the P mode when the speed restriction condition is established.

While in the above embodiment, the engine maximum rotational speed NE' in the E mode is restricted to a lower speed side than the engine maximum rotational speed NP' in the P mode by outputting a control signal to the engine control unit 22 when the speed restriction condition has not been established, any structure may be adopted in the vehicle speed restriction means as long as the maximum vehicle speed in the E mode is restricted to a lower speed side than the maximum vehicle speed in the P mode. It may be arranged that the engine maximum rotational speed is not restricted in the P mode both during excavation and during travel. While it is arranged that the P mode and the E mode are selected by the mode changeover switch 19, the selection means is not limited to that. While the torque converter speed ratio e is determined by the rotational speed detectors 14 and 15, the structure of the speed ratio detection means is not limited to that. While the pump load pressure P is detected by the pressure detector 16, the structure of the load pressure detection means is not limited to that. Any structure may be adopted in the rotational speed control means as long as the engine rotational speed is controlled in accordance with the operation amount of the accelerator pedal 11.

While it is arranged that rotation of the engine 1 is transmitted to the tires 113 and 123 through the torque converter 2, the transmission 3, the propeller shaft 4, and the axles 5, any structure may be adopted in the travel drive device. Any structure may be adopted in the speed change means as long as the speed step of the transmission 3 is changed in accordance with the torque converter speed ratio e. While the vehicle speed is detected by the vehicle speed detector 13, any structure may be adopted in the vehicle speed detection means. While it is arranged that the controller 10, as a speed change control means, performs processing to permit shift up in a condition where the vehicle speed is equal to or greater than Ve (first predetermined value) in the E mode and permit shift up in a condition where the vehicle speed is equal to or greater than Vp (second predetermined value) in the P mode, this condition for shift up may be curtailed.

While an example in which the present invention is applied to a wheel loader has been explained so far, the present invention can be similarly applied to another working vehicle. In other words, the present invention is not limited to the control apparatus of the embodiment as long as the features and the functions of the present invention can be achieved.

While a variety of embodiment and variations have been explained so far, the present invention is not to be limited to those contents. Other aspects that may be conceived of within the range of the technical concept of the present invention are also included within the range of the present invention.

The disclosure of the following priority application is herein incorporated by reference: Japanese Patent Application No. 2009-146198 filed on Jun. 19, 2009.

The invention claimed is:

1. A working vehicle control apparatus, comprising:
a rotational speed control device that controls a rotational speed of a motor in accordance with an operation amount of an accelerator pedal;
a hydraulic pump that is driven by the motor to supply a driving pressure to a working actuator on which a reaction force in accordance with a travel driving force acts;
a travel drive device that transmits rotation of the motor to wheels through a torque converter;
a speed ratio detection device that detects a speed ratio of an input shaft and an output shaft of the torque converter;
a load pressure detection device that detects a load pressure of the hydraulic pump;
a selection device that selects one of a power mode and an economy mode;
a determination device that determines whether or not a speed restriction condition in which a speed ratio detected by the speed ratio detection device is equal to or less than a predetermined value and a load pressure detected by the load pressure detection device is equal to or greater than a predetermined value has been established;
an engine rotational speed restriction device that restricts a maximum rotational speed of the motor upon selection of the economy mode to a lower speed side than a maximum rotational speed of the motor upon selection of the power mode when it is determined by the determination that the speed restriction condition has been established; and
a vehicle speed restriction device that restricts a maximum vehicle speed upon selection of the economy mode to a lower speed side than a maximum vehicle speed upon selection of the power mode when it is determined by the determination device that a speed restriction condition has not been established.

2. A working vehicle control apparatus according to claim 1, further comprising:
a speed change device that changes a transmission speed step in accordance with a speed ratio detected by the speed ratio detection device;
a vehicle speed detection device that detects a vehicle speed; and
a speed change control device that permits the speed change device to shift up in a condition where a vehicle speed detected by the vehicle speed detection device is equal to or greater than a predetermined value, wherein:
the speed change control device permits shift up in a condition where a detected vehicle speed is equal to or greater than a first predetermined value upon selection of the economy mode and permits shift up in a condition where a detected vehicle speed is equal to or greater than a second predetermined value, which is greater than the first predetermined value, upon selection of the power mode.

3. A working vehicle control apparatus according to claim 2, wherein:
the speed change control device permits the shift up in a further condition where it is determined by the determination device that a speed restriction condition has not been established.

* * * * *